May 11, 1965 F. J. BLUME ETAL 3,182,751
VERTICAL CONVEYOR AND GUIDED CARRIER CONNECTED BY A TENSION ARM
Filed Oct. 3, 1960 2 Sheets-Sheet 2
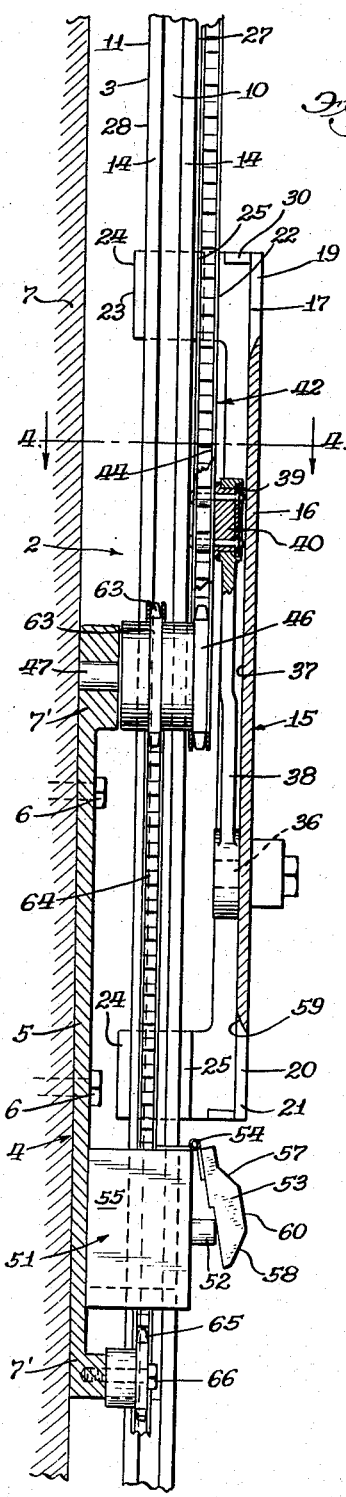
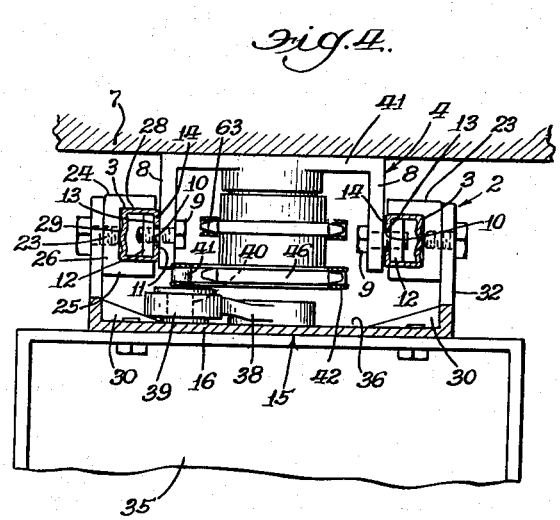
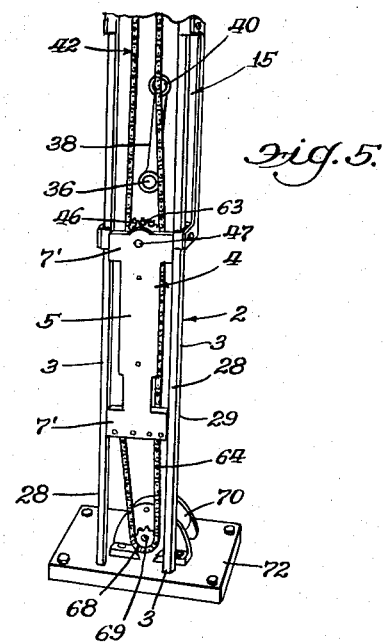
INVENTORS.
Frank J. Blume
Alan J. Blume
By John J. Kowalik
Atty.

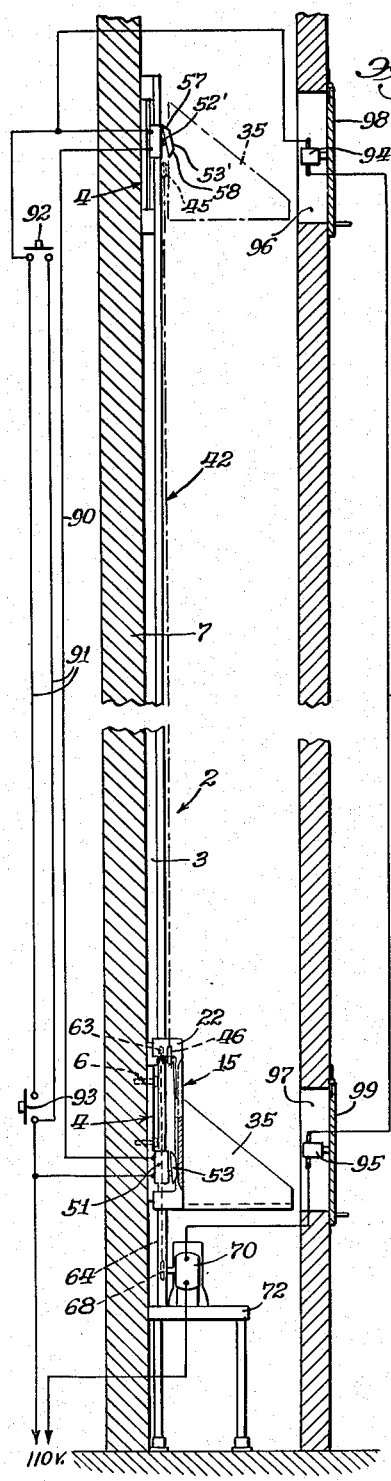

United States Patent Office 3,182,751
Patented May 11, 1965

3,182,751
VERTICAL CONVEYOR AND GUIDED CARRIER CONNECTED BY A TENSION ARM
Frank J. Blume, 1551 W. Thomas, Chicago, Ill., and Alan F. Blume, 6908 N. Manheim, Des Plaines, Ill.
Filed Oct. 3, 1960, Ser. No. 60,056
7 Claims. (Cl. 187—17)

This invention relates to conveyors and more particularly to an upright conveying device.

In general conveyors of this class are cumbersome and require extensive space, and demand expansive installations. The bulkiness of the structure coupled with its complicated circuitry increase not only the initial costs but also greatly multiply maintenance problems.

A general object of the invention is to provide a novel vertical elevator which is compact, simple, rugged and dependable in service.

A further object of the invention is to provide a vertical elevator which utilizes a chain drive and a novel suspension for the carrier basket from the chain such that the drive is only in one direction for the ascent as well as the descent of the basket.

A still further object of the invention is to provide a novel vertical conveyor wherein a simple suspension is provided for the basket from an endless chain which is mounted from a support frame between its side rails by upper and lower sprockets about which the chain is trained, the chain being driven in only one direction and having ascending and a descending runs extending along the rails, and the basket being guided vertically on the frame from the rails and carried from the chain by a tension link pivoted to the back of the carrier substantially medially between the rails.

The invention comprehends a novel vertical conveyor utilizing an integrated carrier frame providing exceptional stability and carrying capacity and having guided engagement with vertical guide rails of a suspension support frame.

These and other objects inherent in and encompassed by the invention will become more readily apparent from the specification and the drawings, wherein:

FIGURE 1 is a side elevational view of the novel vertical conveyor mounted in an inclosure shown in vertical section and an electrical circuit shown diagramatically;

FIGURE 2 is a broken apart enlarged rear elevational view of the conveyor;

FIGURE 3 is an enlarged sectional view taken essentially on the line 3—3 of FIGURE 2;

FIGURE 4 is a horizontal sectional view on line 4—4 of FIGURE 3; and

FIGURE 5 is a fragmentary rear perspective view particularly illustrating the lower end of the conveyor.

*Description of the invention*

Describing the invention in detail and having particular reference to the drawings, the conveyor generally designated 2 comprises a pair of channel-shaped, laterally spaced, vertical, substantially parallel guide rails 3, 3 which at selected vertical areas are interconnected to each other by a mounting frame 4, each frame being I-shaped in elevation and generally U-shaped in horizontal section as best seen in FIGURES 4 and 5 and includes a back vertical piece 5 secured as by bolts 6 to a building wall or the like 7, the frame having upper and lower cross-members 7', 7', each having a pair of vertical side portions 8—8 outstanding from the wall 7. Each portion 8 carrying a bolt 9 which extends through a vertical slot 10 on the inner side 11 of the associated rail 3, the bolt being threaded into a plate or nut 12 which engages the interior sides 13 of the inturned flanges 14 of the rail and clamps the same against the exterior side of the related portion 8.

A runner or basket support or saddle 15 straddles the rails 3 and comprises a substantially flat forward vertical mounting wall 16. Wall or plate 16 is recessed as at 17 at its top edge between the upper and corner extensions 19, 19 at 20 between the lower extensions 21. The upper extensions are provided with inwardly projecting ears or lugs 22 which are bolted to the U-shaped guides 23 each of which has outer and inner flanges 24 and 25 and an intervening lateral web 26 respectively engaging the outer, inner and lateral webs 27, 28 and 29 of the related guide rail 3. The juncture of the ears 22 are reinforced by gussets 30 which are formed integrally therewith and with the associated extension 19. Similarly the lower extensions 21 have inturned lugs 32 flanking the rails 3 and provided with the lower guides 23 which engage the side rails in similar manner to the upper guides 23, and the parts are therefore identified in identical manner.

A basket or carrier 35 is connected as by bolts to the forward side of the wall 16 and a generally horizontal pivot pin 36 projects from the back side 37 of the wall 16 and is located substantially medially between the lateral edges thereof and pivotally connects to the lower end of a tension support rod 38 which at its upper end 39 is pivotally supported from a pin 40 which is connected upon a chain link 41 of a chain 42 which comprises ascending and descending runs 43 and 44 and is trained about upper and lower sprockets 45 and 46, the lower sprocket being rotatably mounted upon a horizontal shaft 47 which is secured in the cross-piece 7' medially between the side rails 3 along which track the runs 43 and 44 of the chain 42. As best seen in FIGURE 3, the chain comprises laterally spaced elongated links and pins interconnect the links to provide articulation therebetween as well known to those skilled in the art. Referring now to the area of the numeral 39 in FIGURE 3 it will be seen that two of the pins interconnecting the chain links extend through the pivot pin 40 FIGS. 4 and 5. These two pins have rivet heads at opposite ends which provide means securing these pins with the pivot member.

It will be understood that the upper frame 4 is identical to the lower frame and each comprises in addition to the upper cross-piece 7', a lower cross piece 7'.

The lower end of the vertical portion 5 mounts a normally closed switch 51 of a normally closed circuit, the switch having a forwardly projecting button 52 which if depressed breaks the circuit, the button 52 being actuated by a cam flap 53 which is hinged at its upper extremity by hinge 54 to the switch casing 55 for swinging movement about a substantially horizontal axis, the cam block 53 being yieldably held by the spring-loaded button mechanism 52 in a position in the path of movement of the carrier 15 and presents upper and lower cam edges or profile facets 57 and 58 (FIGURE 3), the facet 57 inclining downwardly and outwardly and in the projected or extended position of the cam block as shown in FIGURE 3 is engaged by the cam or wedge face 59 which is presented at the lower edge of the wall 16 on its back side and slopes downwardly and outwardly to slide over the cam block 53 as the basket and carrier descend, the block 53 having an outer flat face 60, which engages the back side 37 of the wall 16. Restarting of the conveyor is accomplished by temporarily bypassing the circuit of switch 51 until the carrier is elevated off the switch 51 with attendant sliding off of the carrier wall 16 from the cam block 53, the elevation or drive of the conveyor being accomplished through a sprocket 63 connected with sprocket 46, sprocket 63 being driven by chain 64 trained thereabout and running over an idler 65 mounted upon pin 66 on the lower cross-member 7' of the frame 4 and under a sprocket 68 which is mounted on the shaft 69 of an electric motor 70 which is supported from a base structure 72 at the lower end of the conveyor.

It will be noted that the upper edge of the carrier wall 16 is provided on its back side with a cam face 73 which slopes upwardly and outwardly and in ascending to its upper limit engages the lower edge or cam face 58 of the upper cam block 53' swinging the block 53' depressing the button 52' inwardly and opening the upper switch 51' which is mounted upon the upper frame 4 as best seen in FIGURE 1, the switch 51' being normally closed in a closed circuit 90 with the lower switch 51 in series with the motor 70 so that when the carrier and basket are in any intermediate position between the switches, the motor operates. In order to restart the conveyor to lower the basket, the switch 51' is temporarily by-passed and the motor actuated through suitable parallel circuit and after the carrier wall 16 slides off the switch button 52', the circuit being closed, continues in movement.

In operation, assuming the basket is in the upper position, the by-pass circuit 91 is actuated by closing switches 92 or 93 and the carriage caused to descend sliding off the upper cut-off switch 52' which closes the primary circuit through switch 51 until the lower cam edge 59 rides over the edge 58 of the cam block 53.

It will be understood that either of the by-pass switches 92 or 93 is only momentarily closed to restart the carriage and that thereafter the primary circuit takes over.

The door switches 94 and 95 of the upper and lower stations 96 and 97 are normally closed by the doors 98 and 99 when closed. These switches 94 and 95 open and break the circuit when the doors are open.

It will be understood that the foregoing description presents the preferred embodiment of the invention and that various other forms of the invention will be readily apparent to those skilled in the art within the scope of the appended claims.

We claim:

1. A vertical conveyor having a support structure comprising a pair of vertical guide means, carrier means between and in guided engagement with said guide means and including a mounting plate having lateral edges, operating means for lifting and lowering said carrier means along said guide means and including an electrical system having switching means between the guide means at predetermined locations along the path of movement of the carrier means, each said switching means including a switch and a cam flap pivotally supported from the structure between said guide means and abuttable with the respective switch, and cam means including cam surfaces on the upper and lower ends of the mounting plate, said upper cam surface engageable with the cam flaps thereabove upon ascent of the carrier means and said lower cam surface engageable with the cam flaps therebelow upon descent of the carrier means, and said operating means including an endless chain having vertically extending advance and return runs laterally flanking said cam surfaces, a tension arm pivotally connected at one end to one of said runs and pivotally connected at its other end to said mounting plate at a point between said lateral edges of the plate below the upper edge thereof, said arm having a length between its points of connection to the mounting plate and the chain greater than the vertical distance between said points whereby said arm tends to spread the chain apart away from the cam surfaces.

2. A vertical conveyor comprising support means, an endless chain rotatably supported at vertically spaced turns and having return and advance runs disposed in a vertical plane, a tension arm having an upper end pivotally supported from one of said runs of said chain, a carrier in guided engagement with the support means for vertical movement, and means pivotally connecting the lower end of said arm with the carrier at a point substantially medially between the lateral edges and the upper and lower ends thereof at a point between the runs of the chain and adjacent to its lower end on axes extending perpendicularly to the plane of said runs.

3. A vertical conveyor comprising support means, an endless chain rotatably supported therefrom at vertically spaced points, a tension arm having an upper end pivotally supported from said chain on axes extending normal to the plane of the chain, a carrier in guided engagement with the support means for vertical movement, and means pivotally connecting the lower end of said arm with the carrier, said arm providing the sole support for the carrier from the chain and said chain having vertical advance and return runs disposed in a vertical plane perpendicular to the axes of pivot of the arm and said means pivotally connecting the lower end of the arm with the carrier being disposed medially between said runs at a point between the upper and lower ends of the carrier and between its lateral edges.

4. A vertical conveyor comprising a support including vertical laterally spaced guide means, a carrier therebetween slidably movable vertically thereon, upper and lower sprockets mounted upon the support on generally parallel axes, an endless chain trained about the sprockets and having advance and return runs substantially paralleling the said guide means, an arm having a lower end pivotally connected to the carrier substantially medially between said guide means and having an upper end pivotally connected to one of said runs of the chain, said chain, carrier and arm being disposed in parallel vertical planes the axes of pivot of the arm to chain and to the carrier being between the upper and lower edges of the carrier and between the vertical lateral edges thereof and being substantially parallel and the arm diverging upwardly from the vertical and extending generally parallel to the plane of the chain.

5. A vertical conveyor comprising a support including vertical laterally spaced guide means, a carrier therebetween slidable vertically thereon, upper and lower sprockets mounted upon the support on generally parallel axes, an endless chain trained about the sprockets and having advance and return runs substantially paralleling the said guide means, an arm having a lower end pivotally connected to the carrier substantially medially between the guide means and having an upper end pivotally connected to one of said runs of the chain, the axes of pivot of the arm to the chain and the carrier being between the upper and lower edges thereof and being substantially parallel and the arm diverging upwardly from the vertical, and said guide means comprising substantially vertical generally parallel box section tracks each having a vertical slot opposing the slot of the other track, a member comprising a vertical section spaced transversely of the plane of the tracks and having upper and lower cross-pieces and outwardly projecting ears extending between said tracks and abutting the respective tracks across the slot therein, a nut plate in each track, and a bolt through each ear threaded into the respective plate securing the structure with the tracks, said section of said member presenting upper and lower cam edges between said tracks.

6. The invention according to claim 4 and the connection of the arm to the chain comprising laterally spaced elongated links and a pair of pins interconnecting the links to each other, certain of said pins extending laterally outwardly of a side of the chain, a pivot member having openings admitting said pins therethrough, means securing the pins with the pivot member, and said pivot member journalled to the arm.

7. In a vertical conveyor, a pair of spaced vertical guides, a carrier mounting structure having means in guided engagement with the guides for vertical movement along the guides and having a vertical plate spanning the space between the guides and having upper and lower cam edges respectively inclined upwardly and outwardly and downwardly and outwardly, means for moving said structure including an electrical circuit having a plurality of station switches spaced vertically between said guides, cam means operatively associated with the switches and disposed in the path of movement of the structure for camming engagement by said upper cam edge upon ascent of the structure and by the lower cam edge during descent of the structure, an endless chain mounted on the guides, and a tension arm having a lower end connected to the plate between its upper and lower ends and having an upper end below the upper end of the plate connected to the chain.

References Cited by the Examiner

UNITED STATES PATENTS

| | | | |
|---|---|---|---|
| 444,788 | 1/91 | Wyland | 187—16 X |
| 749,038 | 1/04 | Dodge | 198—145 |
| 975,181 | 11/10 | Turnbull. | |
| 1,287,984 | 12/18 | Haschek et al. | |
| 1,485,302 | 2/24 | Sharp | 187—95 |
| 1,905,248 | 4/33 | Skaife | 187—95 |
| 1,923,034 | 8/33 | Hendricksen | 187—3 |
| 1,940,867 | 12/33 | James et al. | 187—16 |
| 1,971,072 | 8/34 | James et al. | 187—16 |
| 1,990,363 | 2/35 | Baldwin | 187—3 |
| 2,085,504 | 6/37 | McDill | 187—2 X |
| 2,188,357 | 1/40 | Kiesling | 187—3 |
| 2,372,157 | 3/45 | Burton | 187—16 X |
| 3,043,400 | 7/62 | Blume et al. | 187—3 |

FOREIGN PATENTS 505,317   5/39   Great Britain.

EVERETT W. KIRBY, *Primary Examiner.*

KARL J. ALBRECHT, ANDRES H. NIELSEN, RALPH H. BRAUNER, LOUIS J. DEMBO, *Examiners.*